United States Patent [19]

Korth

[11] 4,035,461

[45] July 12, 1977

[54] METHOD OF MAKING AN EXTRAVERTABLE-WALL CONTAINER

[75] Inventor: Herbert Korth, Hamburg, Germany

[73] Assignee: Krauss-Maffei Aktiengesellschaft, Munich, Germany

[21] Appl. No.: 549,000

[22] Filed: Feb. 11, 1975

[51] Int. Cl.² .................................. B29C 17/07
[52] U.S. Cl. ............................. 264/89; 264/97; 264/295; 264/296; 425/536; 425/564
[58] Field of Search ............... 264/89, 90, 92, 94, 264/96, 97, 98, 99, 296, 295; 425/DIG. 209, DIG. 214, DIG. 207; 150/.5; 215/1 C; 53/29, 37

[56] References Cited

U.S. PATENT DOCUMENTS

| | | | |
|---|---|---|---|
| 2,208,744 | 7/1940 | Bergerioux | 215/1 C UX |
| 3,252,625 | 5/1966 | Cattaneo | 150/.5 X |
| 3,819,789 | 6/1974 | Parker | 425/DIG. 214 |

FOREIGN PATENT DOCUMENTS

| | | | |
|---|---|---|---|
| 1,046,602 | 12/1953 | France | 264/97 |
| 1,001,672 | 8/1965 | United Kingdom | 264/98 |
| 969,392 | 9/1964 | United Kingdom | 215/1 C |
| 896,890 | 5/1962 | United Kingdom | 215/1 C |

*Primary Examiner*—Jan H. Silbaugh
*Attorney, Agent, or Firm*—Karl F. Ross; Herbert Dubno

[57] ABSTRACT

An extravertable-wall container is formed by extruding a parison into a blow-mold cavity having a pair of oppositely diverging halves which are joined at their widest portions, one half being slightly smaller than the other so that the frusto-conical wall of the container formed in this half can be pushed (compressed) into the other half to produce a stackable cup-shaped structure. When the container is to be filled, the inner wall portion is extraverted to form an extension of the container, e.g. the bottom. The container may have a frustoconical upwardly widening base which is geometrically smaller but inverted with respect to the larger frustoconical head. A neck or filling opening may be provided on this head.

3 Claims, 6 Drawing Figures

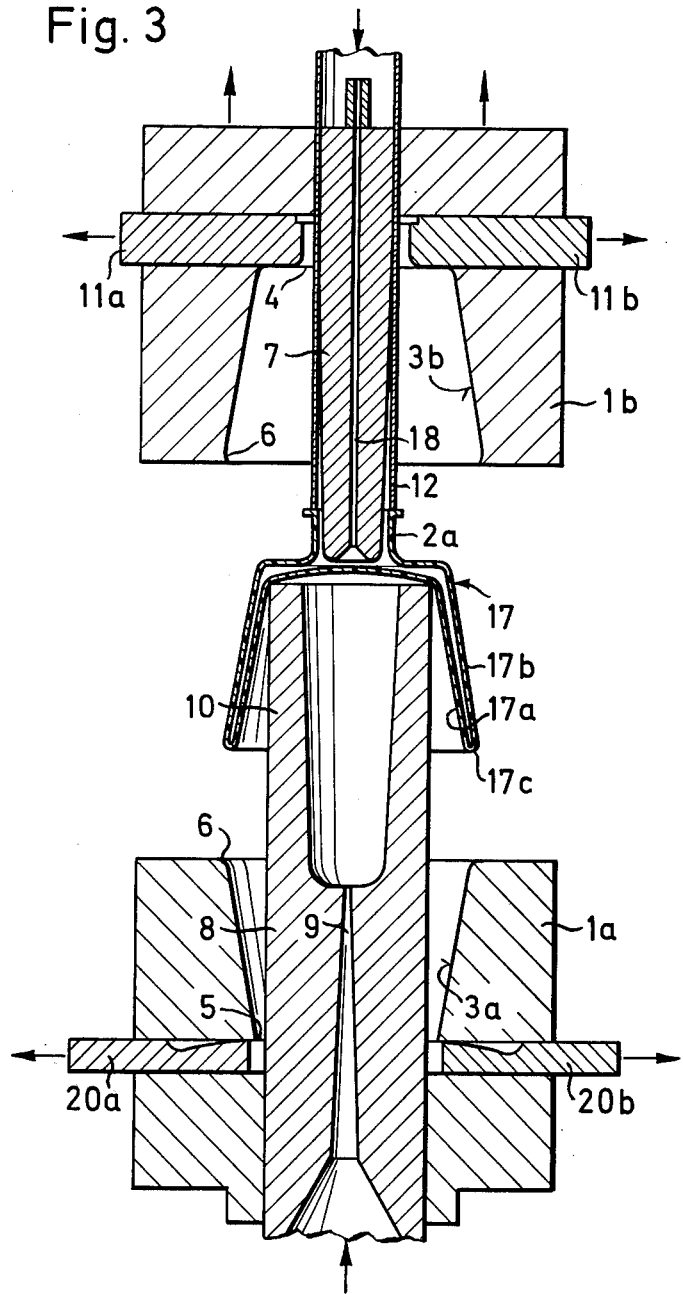

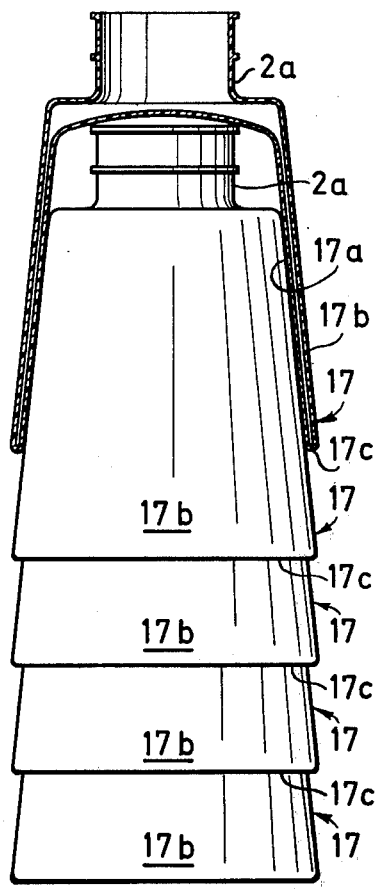
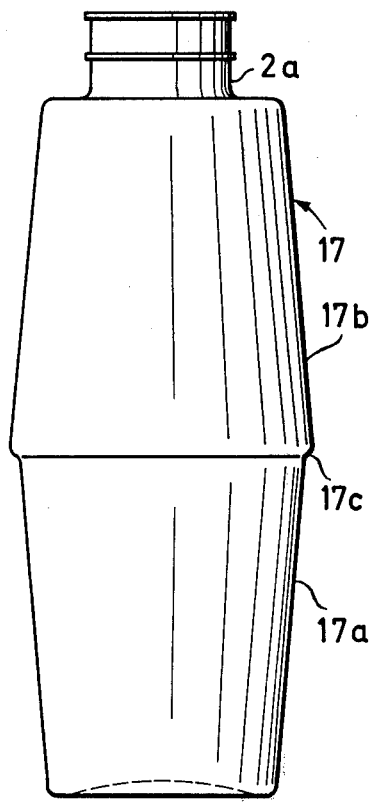
Fig. 4a
Fig. 4b

METHOD OF MAKING AN EXTRAVERTABLE-WALL CONTAINER

FIELD OF THE INVENTION

The present invention relates to a method of making a container structure which is versatile, stackable and compact.

BACKGROUND OF THE INVENTION

The fabrication of containers with thin thermoplastic walls from thermoplastic synthetic resins such as polyethylene and vinyl polymers has found increasing acceptance in recent years. Such containers may be made by a blow-molding process in which a hollow thermoplastic parison is injected or extruded into a cavity which is expanded to form a blow mold. Fluid is introduced into the interior of the parison while the latter is still in a plastically deformable state to expand the parison into contact with the walls of the mold, thereby producing a receptacle of small wall thickness and complex or simple design as may be desired.

A problem with such containers is that they occupy as much space in an empty state as in filled condition and hence create difficulties with respect to transport and storage in the empty condition between manufacture and filling.

It has been proposed to shape these containers so that they can be stacked, but the same problem is nevertheless present since stacking depends on the head and bottom shapes of the vessels only and does not permit large numbers of them to occupy a substantially smaller volume than is occupied by the same number individually. In other words, the neck of the container may have a configuration complementary to a recess in the bottom so that either the empty or the filled containers can be stacked, but this does not permit a reduction of the storage volume for empty containers to any significant extent.

OBJECTS OF THE INVENTION

It is an object of the invention to provide a method of making an improved stackable container structure which can be conveniently transported and stored and nevertheless has a high capacity.

Another object is to provide a method of making an improved low-cost multiple-use receptacle or container, e.g. bottle, of thermoplastic synthetic resin which can be conveniently handled, manufactured, filled and stored.

Still another object of this invention is to provide a method of fabricating at low cost and in a serial manner containers of improved versatility, free from the disadvantages of earlier containers and fabrication methods.

SUMMARY OF THE INVENTION

These objects and others which will become apparent hereinafter are attained, in accordance with the present invention, by the provision of a blow-molded elongated container having geometrically similar but oppositely oriented upper and lower portions designed such that, after the container is blown, the smaller portion can be pressed into the larger portion so as to have the walls of the two portions lie in close juxtaposition and substantially parallel to one another. As a result, the container can be compacted into a cup-shaped body which can be stacked with similar cup-shaped bodies. For filling, the inner wall of the cup-shaped body is extraverted (rolled outwardly) to expand the container to its full height.

According to the principles of the present invention, containers of this type are fabricated from thermoplastic synthetic resin by injection molding a parison into a cavity, engaging a part of the parison (e.g. a portion corresponding to the neck of the vessel to be made), and blowing the parison after withdrawal of the walls of the original cavity, to conform to a blow mold cavity, whereupon one end of the blow molded container is pressed into the other end of the latter so that the pressed-in part can be expanded outwardly again for the extraverting action mentioned previously.

According to the principles of this invention, a substantial part, preferably about half, of the hollow body formed by blow molding is collapsed inwardly into the other half, to lie wholly within the other half with the walls of the two halves substantially parallel.

Preferably, the collapse is effected while part of the parison (e.g. the neck) remains fixed in a gripper portion of the mold structure so that this part is not blown, expanded or reduced in thickness.

According to another aspect of the invention, the apparatus for producing the container according to the invention comprises a blow-molding and injection-molding apparatus, the injection-molding apparatus including a blowing mandrel and a mold-forming head which cooperates with this mandrel to define the mold cavity for the preform or parison. Means is provided for injecting through this latter member the thermoplastic synthetic resin material and for withdrawing this nozzle from the blow mold cavity to permit expansion of the parison into contact with the walls thereof. An essential feature of this aspect of the invention resides in providing this nozzle as the means for inwardly collapsing the collapsible half of the container or as part of the collapsing tool.

The injection-molding and collapsing tool is thus movably disposed in the blow-mold cavity and cooperates with a mandrel which cooperates with transversely movable slide members to form the neck of the container. Similarly, the collapsing tool can be withdrawn through an opening in the blow-mold cavity and this opening can be closed by slidable shutters designed to form the bottom of the blow-mold cavity.

It has been found to be advantageous to shape this collapsing member with an elongated cup-shaped recess in the direction of the blowing mandrel and advantageously widening in this direction the recess or cavity extending from the end of the injection-nozzle orifice which thus terminates within the collapsing member.

According to still another feature of the invention, the upper and lower halves of the unitary, integral and one-piece container have the configuration of geometrically similar frustoconical cones adjoining at a shoulder at their widest portions.

In practice, it has been found that the time required for pressing one half of the container into the other half (collapsing the hollow body) is short and hence does not interfere with the production capacity of the apparatus. Since the container resembles a cup in the collapsed condition, it can be stacked with similar shaped bodies in further small space so that the volume required for each collapsed container is a further small fraction of the volume of the filled noncollapsed container.

Because of the manner in which the containers are collapsed and the way in which the inner part is extraverted during filling, the filling operation is greatly simplified and there is considerable advantage when the container is used for liquids like milk which tend to foam when cascaded into a large empty space. In the collapsed condition, there is only a small air volume between the portions or parts of the bottle, and the volume between these parts increases progressively with filling so that complex measures for discharging air from the bottle are superfluous. Foaming is precluded by the absence of free space.

Another advantage is that, in the collapsed condition, the structure forms a cup of double-wall design in which hot or cold liquids can be served with a minimum change in temperature since the air gap between the inner and outer halves is an excellent thermal insulation. Without the neck, therefore, the cup-shaped structure is a convenient liquid receptacle for drink-vending machines and the like.

Another advantage resides in the fact that after the filled container has been emptied the container can again be collapsed, e.g. by hand, to a compact structure for disposal or even for use as a drinking cup.

BRIEF DESCRIPTION OF THE DRAWING

The above and other objects, features and advantages of the present invention will become more readily apparent from the following description, reference being made to the accompanying drawing inw which:

FIG. 3 is a view similar to FIGS. 1 and 2 showing the apparatus in the position following blowing in which the lower half of the container is collapsed into the upper half thereof;

FIG. 4a shows a stack of the collapsed containers according to the present invention, the upper one in section and the lower containers in elevation;

FIG. 4b is a vertical elevational view of the filled container according to the invention.

SPECIFIC DESCRIPTION

Figure 1:
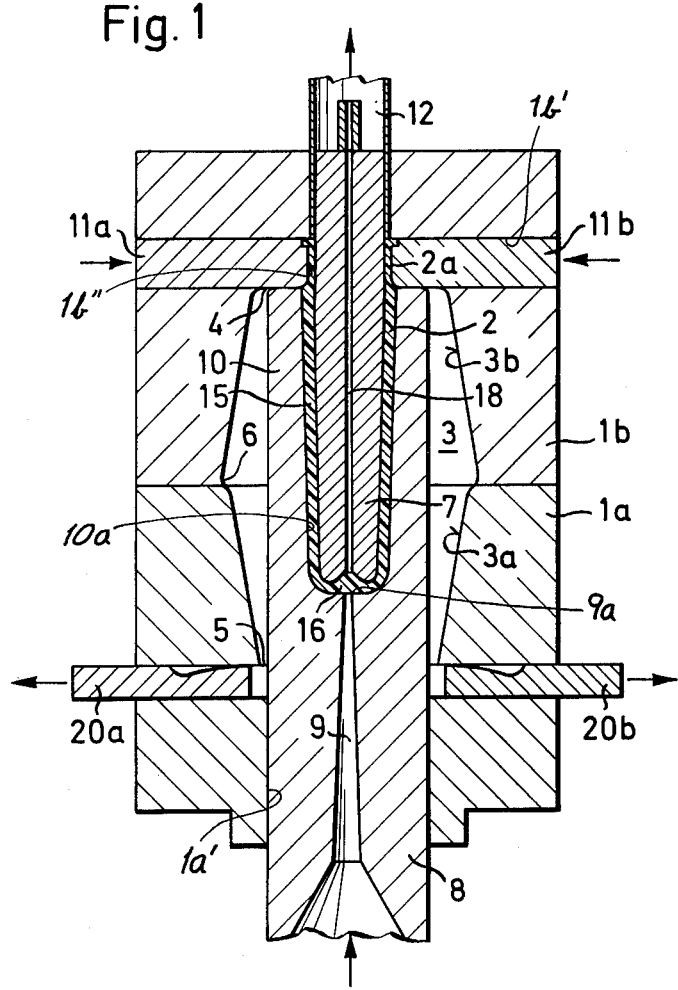
FIG. 1 is a longitudinal section in diagrammatic form through an apparatus for carrying out the method in accordance with the present invention and showing a first stage thereof.

In FIG. 1 I have shown an apparatus for the production of milk containers or other vessels adapted to be filled with a liquid and composed of thermoplastic synthetic resin.

The apparatus basically consists of a bipartite blow mold, 1a, 1b defining a mold cavity 3a and 3b having the general configuration of the container to be produced (see FIG. 4b).

At the upper end of the upper mold half 1b, the latter is provided with a pair of sliders 11a and 11b movable transversely to the axis of the device as presented by the arrows and defining with a wall 1b', an annular space 1b'' surrounding a blowing mandrel 7 which is axially shiftable from the position shown in FIG. 1 upwardly in the direction of the arrow. The compartment 1b'' conforms to the neck of the bottle.

An injection-molding nozzle 8 can be introduced into the blow mold cavity 3 axially through the bore 1a' in the lower mold half 1a and has a cup-shaped recess 10a in its end open toward the blowing mandrel 7 which has a slight outward taper conforming to the inward taper of the blowing mandrel 7. The injection-molding nozzle passage 9 terminates at an orifica 9a at the base of the cavity 10a so that thermoplastic synthetic resin can be injected into the space 15 defined between the mandrel 7 and the wall of recess 10a to form a closed-end tubular parison 2 with a neck 2a.

The blow-mold cavity 3 is formed by the two frustoconical cavities 3a and 3b, the latter being geometrically similar but larger than the former. The wide bases of these frustoconical cavities adjoin at a shoulder 6. The frustocones differ only slightly in size.

The blow mold opening 4 at the upper end of the cavity is closed by slides 11a and 11b except for the space 1b'' and the blowing mandrel 7 which also forms a core about which the parison 2, 2a is formed.

The passage 9 is connected with an injection-molding head of any conventional design and which produces a plastically flowable heated synthetic resin which is driven through the passage 9 into the mold cavity 15 formed between the nozzle body 8 and the mandrel 7 as described.

The end of the upper section 10 of the nozzle body 8 sealingly engages the slides 11a and 11b, closing the cavity 15. The region around the orifice 9a forms the bottom 16 of this cavity.

Figure 2:
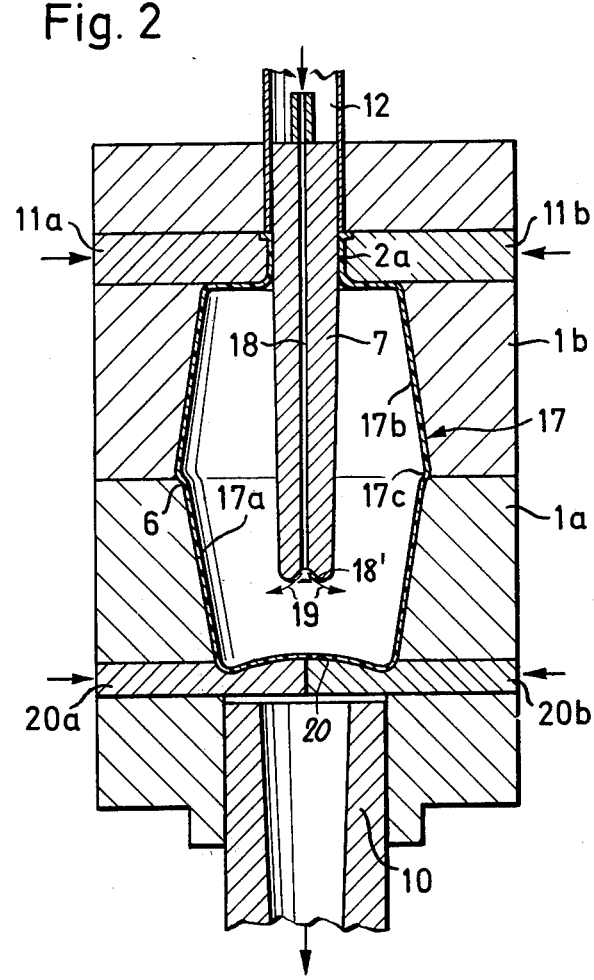
FIG. 2 is a view similar to FIG. 1 illustrating the position of the parts after blowing of the parison.

Once the synthetic-resin material has been injected to form the parison 2, 2a, the nozzle body 8 is withdrawn axially downwardly in the direction of the arrow shown in FIG. 2 and a pair of gates 20a, 20b are shifted laterally inwardly to define the bottom wall 20 of the blow-mold cavity. Compressed air is forced through the blowing mandrel 7 which is formed with an axial passage 18 terminating at an orifice 18' within the parison 2, 2a, the compressed air spreading inwardly (arrow 19) to force the synthetic resin against the walls of the mold 3.

As a result, there is formed a vertically elongated container 17 having a frustoconical cup-shaped lower half 17a which is geometrically similar to but smaller than the upper frustoconical cup-shaped half 17b. The neck 2a of the bottle is not blown and hence remains with its original thickness.

As can be seen from FIG. 3, in the next step the upper mold half 1b is withdrawn relative to the mandrel 7 after the slides 11a and 11b have disengaged the neck and nozzle body 8 is moved upwardly (also in FIG. 3) to carry the bottom of the container 17 upwardly and into the top of the container, i.e. to introvert the lower cup half 17a into the upper cup half 17b whereby the the annular shoulder 17c of the container lies at the upper lip of the double-wall cup thus formed. Compressed air is supplied through the passage 9 to depress the bottom of the inner cup wall upwardly by the pressure.

Within the container is a sleeve 12, which engages the neck 2a and is slidable on the injection and blowing mandrel 7. This sleeve 12 moves downwardly during the vertical rise of member 10 to reduce the total axial displacement necessary to achieve introversion of the lower cup half 17a. The container is then cut off at the neck 2a and has the configuration shown in FIG. 4a so that it can be stacked with smaller containers as there shown. When the container is filled, the inner half 17a is extraverted gradually so that the filling liquid, e.g. milk, does not significantly foam. In its filled state, the container has the configuration shown in FIG. 4b.

Figure 5:
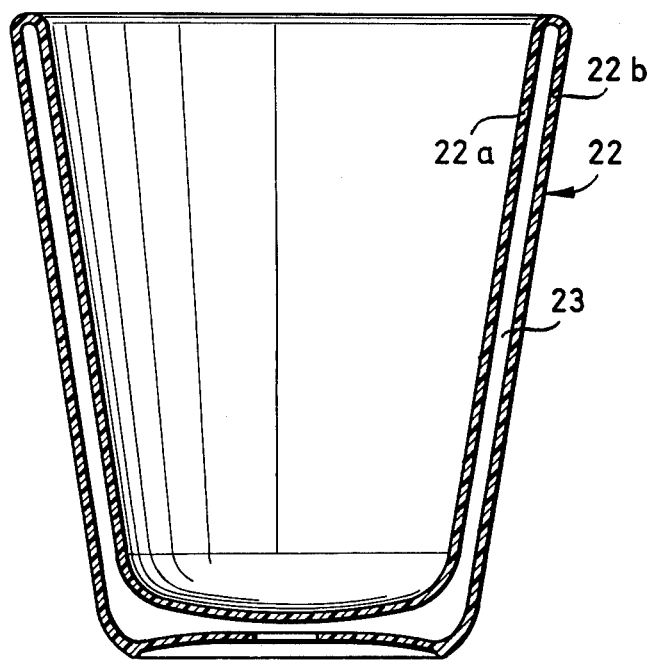
FIG. 5 is a cross section through a cup-shaped hollow body according to this invention.

If desired, the neck 2a may be cut off or omitted in formation so that the structure will have the configuration shown in FIG. 5, namely, a double-wall drinking cup 22 with high heat-insulating properties. The two halves 22a and 22b are collapsed one into the other leaving a small airgap 23 between them.

I claim:

1. A method of making a container comprising the steps of:

enclosing a blowing mandrel in a blow mold having a first half surrounding said mandrel at a location spaced from an end thereof and defining a cup-shaped cavity widening away from said location, said mold having a second half formed with a cup-shaped cavity geometrically similar to the cup-shaped cavity of said first half and widening in the direction thereof, said cup-shaped cavities adjoining to produce a molding cavity having the configuration of a container to be formed;

advancing an injection nozzle through said second half to surround said mandrel and define an elongated injection cavity therewith;

injecting a thermoplastic synthetic-resin material into said injection cavity through said nozzle to form a closed end parison around said mandrel;

withdrawing said nozzle from said molding cavity through a wall of said second half and closing said wall;

blowing said parison through said mandrel to expand said parison against the walls of said molding cavity, thereby forming a container conforming to the configuration of said molding cavity and having a first cup portion lying in the cup-shaped cavity of said first half and a second cup portion lying in the cup-shaped cavity of said second half;

separating said first and second halves of said mold to release said container from said molding cavity; and axially displacing said first cup portion toward said nozzle and advancing said nozzle toward said mandrel to entrain the bottom of said second cup portion into said first cup portion and introvert said second cup portion within said first cup portion.

2. The method defined in claim 1, further comprising the steps of molding a neck on said parison around said mandrel during the injection of said thermoplastic synthetic-resin material into said injection cavity.

3. The method defined in claim 1, further comprising the step of introducing a liquid filling material into said container to displace outwardly the introverted second cup portion during filling of the container.

* * * * *